United States Patent [19]

Bochi et al.

[11] Patent Number: 4,693,355
[45] Date of Patent: Sep. 15, 1987

[54] AUTOMATIC COMBINATORIAL WEIGHTING APPARATUS

[75] Inventors: Hiroshi Bochi, Gamou; Kenji Ueda, Kyoto; Satoshi Konishi, Kusatsu, all of Japan

[73] Assignee: Ishida Scales Mfg. Co., Ltd. Kyoto, Japan

[21] Appl. No.: 796,742

[22] Filed: Nov. 12, 1985

[30] Foreign Application Priority Data

Nov. 12, 1984 [JP] Japan .................... 59-170329[U]
Nov. 12, 1984 [JP] Japan .................... 59-17033[U]

[51] Int. Cl.⁴ .................... B65G 11/00; E04B 1/84
[52] U.S. Cl. .................... 193/2 R; 177/25; 177/18; 198/956; 181/207; 181/290
[58] Field of Search .................... 193/2 R; 177/25, 59, 177/25.18; 198/534, 956; 181/207, 290

[56] References Cited

U.S. PATENT DOCUMENTS

| 4,399,880 | 8/1983 | Konishi | 177/25 X |
| 4,478,300 | 10/1984 | Mikami | 193/2 R X |
| 4,529,660 | 7/1985 | Heim | 193/2 R X |
| 4,602,709 | 7/1986 | Ueda | 177/25 X |

FOREIGN PATENT DOCUMENTS

| 52498 | 5/1982 | European . | |
| 101313 | 2/1984 | European . | |
| 2424201 | 12/1979 | France | 193/2 R |
| 2425280 | 1/1980 | France | 193/2 R |
| 742283 | 6/1980 | U.S.S.R. | 193/2 R |

Primary Examiner—Andres Kashnikow
Assistant Examiner—Mary Beth O. Jones
Attorney, Agent, or Firm—Staas & Halsey

[57] ABSTRACT

An automatic combinatorial weighing apparatus includes a double collection chute assembly disposed in delivery paths for passage of articles to be weighed. The double collection chute assembly includes an inner collection chute having an outlet and a pair of outer collection chutes having respective outlets, the outlets being connected to timing hoppers, respectively. Articles flow down the inner and outer collection chutes at as equal speeds and in as equal times as possible, the speeds being increased as much as possible, due to valleys created by flat plates which form the chutes. To prevent an increase in noise produced by hitting engagement of the articles with the chutes as the articles flow down the chutes at high speeds, a vibration damper having a vibration-restriction damping capability is disposed in an area of the delivery paths for damping the vibration to suppress the noise.

1 Claim, 22 Drawing Figures

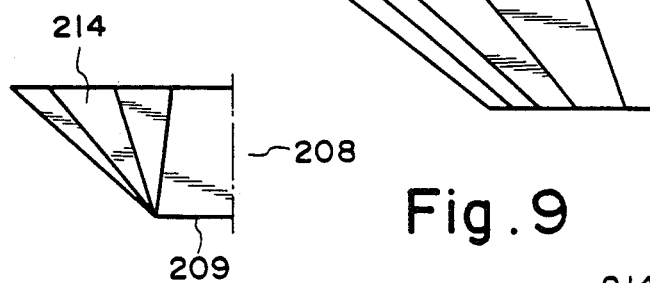
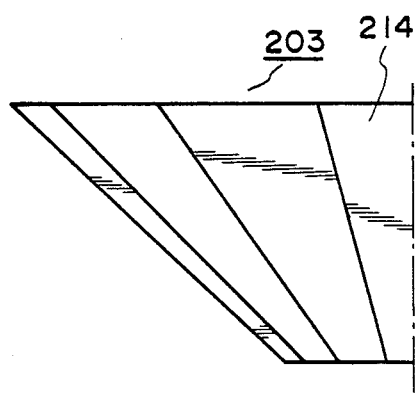
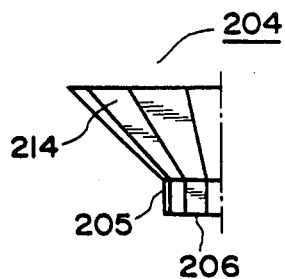

AUTOMATIC COMBINATORIAL WEIGHING APPARATUS

BACKGROUND OF THE INVENTION

The present invention relates to an automatic combinatorial weighing apparatus.

Automatic combinatorial weighing devices operate by supplying articles to be weighed to a plurality of weighing machines, effecting a combinatorial arithmetic operation based on weights detected by the weighing machines, selecting an optimum weight combination with a combined weight equal or closest to a target weight, and discharging the articles from only those weighing machines which give the optimum weight combination, thereby obtaining a group of articles having their combined weight equal or closest to the target weight.

One such automatic combinatorial weighing apparatus will be described with reference to FIG. 21 of the accompanying drawings. The automatic combinatorial weighing apparatus, generally denoted at 1, has a frame 2 and a subframe 3 disposed above the frame 2 and supported thereon by a plurality of legs 2a. A distributing or dispersing table 4 is mounted centrally on the subframe 3 using an electromagnetic three-dimensional vibrator 5. The weighing apparatus 1 includes a plurality (14, for example) of heads comprising respective radial troughs 6 disposed around the distributing table 4 and mounted on the subframe 3 by respective electromagnetic vibrators 7. A plurality of pool hoppers 8 are positioned respectively outside and below the radial troughs 6, and a plurality of weighing hoppers 10 are disposed below the pool hoppers 8, respectively, the weighing hoppers 10 being supported by a plurality of weighing devices 9, respectively. The pool hoppers 8 and the weighing hoppers 10 have respective lids which can be opened and closed by link mechanisms 16 through push rods 14 of opening and closing devices 13 mounted on the lower surface of the subframe 3. The opening and closing devices 13 can be actuated through a gear transmission device 12a by a motor 12 mounted centrally on the lower surface of the subframe 3.

Collection chutes 11 are mounted on the frame 2 below the weighing hoppers 10 for collecting the articles discharged from the weighing hoppers 10 and discharging the collected articles to a packaging device (not shown).

The automatic combinatorial weighing apparatus thus constructed operates as follows: Articles to be weighed are dropped from an article feeder (not shown) onto the distributing table 4 and distributed thereby into the radial troughs 6, from which the articles are supplied to the pool hoppers 8, respectively. The articles are then fed from the pool hoppers 8 into the respective weighing hoppers 10 and weighed therein by the weighing devices 9, respectively. Weight signals from the weighing devices 9 are applied to an arithmetic control unit (not shown), which effects a combinatorial arithmetic operation based on the weight values represented by the applied weight signals. The arithmetic control unit then selects an optimum weight combination with a combined weight equal or closest to a target weight, and controls the opening and closing devices 13 to open the lids of those weighing hoppers 10 which contain the articles giving the optimum weight combination, thereby discharging the articles from the selected weighing hoppers 10. The weighing hoppers 10 from which the articles have been discharged are then supplied with articles from the corresponding pool hoppers 8, which are in turn supplied with articles from the corresponding radial troughs 6.

The arithmetic control unit comprises a microcomputer for effecting the combinatorial arithmetic operations necessary to enable the automatic combinatorial weighing apparatus 1 to weigh articles at high speed.

To assist the automatic combinatorial weighing apparatus 1 in operating at high speed the electronic controls, the pool hoppers 8 and the weighing hoppers 10 are arranged in a circular pattern of a small diameter around the central vertical axis of the apparatus 1, i.e., the apparatus 1 has a reduced diametrical size, so that the aritcles will fall and slide along a short path and at high speed. The vertical dimension of the apparatus 1 is also reduced to shorten the path along which the articles fall through the apparatus 1.

As illustrated in FIG. 21, the pool hoppers 8 and the weighing hoppers 10 are arranged such that the collection chutes 11 for delivering the articles fed from the weighing hoppers 10 through timing hoppers 110 to the packaging process are of the greatest size among other components. Since the hoppers 8 and 10 are circularly arranged, the diameter of the collection chutes 11 can not be reduced beyond a certain limit. In addition, if the collection chutes 11 were excessively reduced in their height, their slide surfaces have too a small gradient and impose a large resistance to the sliding movement of the articles thereon, thus preventing higher-speed operation.

Since the lids of the weighing hoppers 10 are openable outwardly and inwardly as shown in FIG. 21, one of the collection chutes 11 is positioned as an inner collection chute for receiving articles through the inwardly openable lids of the weighing hoppers 10 and the other as an outer collection chute for receiving articles through the outwardly openable lids of the weighing hoppers 10. The lids of the weighing hoppers 10 are opened alternately inwardly and outwardly to supply articles to the double collection chute assembly for higher-speed operation.

One requirement for achieving higher-speed operation and removing obstacles against such higher-speed operation in the double collection chute assembly is that the articles discharged from the weighing hoppers 10 be fed along straight paths of least resistance to their sliding movement in the inner and outer collection chutes.

The inner and outer collection chutes are coaxially arranged and required to have their own outlets or timing hoppers 110. Various improvements have heretofore been made to shorten the path of sliding movement of the articles down the inner and outer collection chutes toward their lower outlets.

There has been developed a double collection chute assembly as shown in FIG. 22 of the accompanying drawings. The double collection chute assembly, generally designated at 11 in FIG. 22, has an inner collection chute 111 in the form of a truncated cone and outer collection chutes 112 each in the form of a substantially semicircular cone, the outer collection chutes 112 being symmetrical with respect to a plane S passing through the center of the inner collection chute 111. The inner collection chute 111 has an outlet 113 offset or displaced from the central axis and connected to inclined off-center discharge chutes 114, 115. The outer collection chutes 112 and the inner collection chute 111 create discharge clearances 116 therebetween, which are connected to outlets 117 joined to a downwardly tapered discharge chute 118 having an outlet 120. The inner collection chute 111 has an outlet 119 which is disposed as closely to the outlet 120 as possible. The shapes, sizes, and positions of the inner and outer collection chutes 111, 112 are substantially similar such that the articles falling down the inner collection chute 111 and discharged into the clearances 116 will slidingly drop as quickly as possible over the shortest distance.

With the double collection chute assembly 11, the articles are theoretically assumed to fall quickly down the inner and outer collection chutes 111, 112 and reach the outlets 119, 120 at the same speed in the same period of time. However, the articles tend to hit each other and be caused to jump and flow in meandering or roundabout paths because the slanted surfaces of the chutes 111, 112 are curved. Particularly, while the articles falling in the clearances 116 drop through the discharge chute 118 beneath the outlets 117 to the outlet 120, the articles are forced to flow in a curved path on the inner side of the discharge chute 118, with the result that the articles are caused to flow around about and are apt to be disturbed just before the outlet 120. Therefore, the articles falling down the discharge chute 118 are more likely to flow down at irregular speeds in uneven times than those falling down the discharge chutes 114, 115 of the inner collection chute 111 in which the articles fall more smoothly.

The outer collection chutes 112 are not symmetrical with respect to a plane P normal to the plane S. Therefore, the articles falling on the opposite sides of the plane P fall in different paths and at different speeds in different time periods.

A number of such combinatorial weighing apparatus 1 are generally employed in a packaging center or the like, where mainly foods are processed by the weighing apparatus 1 and where the building of the packaging center is closed to the exterior. When all of the combinatorial weighing apparatus 1 are operated at the same time, much noise is produced by the vibration of the combinatorial weighing apparatus 1 and noise is also produced in a high-frequency range due to hitting engagement of the articles with panels and plates of the apparatus 1 and the resonating vibration of these panels and plates. The combined noise level is intolerably high in the building and hence the working environment is poor. At times, accurate measurements and communications are hindered by such a high noise level.

More specifically, the articles supplied onto the distributing table 4 of the automatic weighing apparatus 1 are delivered from the radial troughs 6 to the pool hoppers 8 to the weighing hoppers 10 to the collection chutes 11. Since the lids of the hoppers 8, 10 are intermittently opened and closed, the articles are caused to follow stepped, irregular and curved paths such as zig-zag paths as the articles are charged and discharged.

Since there are many heads in the combinatorial weighing apparatus 1, the articles are caused to flow through the stepped, irregular and curved paths while the heads are operated in and out of synchronism. Accordingly, a considerably high degree of noise is produced in an area where many combinatorial weighing apparatus 1 are arranged in an array.

The higher the speed of delivery of the articles through the apparatus 1, the larger the noise produced thereby. The noise becomes much larger if the collection chutes are improved for higher speed of flow of the articles through the apparatus 1.

One known approach to solving the noise problem has been to line or coat the surfaces of the pool hoppers 8 hit by the articles as they are disharged radially outwardly from the radial troughs 6 and also to coat surfaces of the lids of the weighing hoppers 10 hit by the articles as they are discharged downwardly obliquely from the pool hoppers 8, with urethane layers or urethane sheets for cushioning the articles to attenuate the noise produced thereby.

However, the sound-insulating materials used in the above arrangement are not sufficiently capable of against insulating noise. To prevent the lining or coating layers from being peeled off when the weighing apparatus 1 are cleaned or operated highly frequently, the lining or coating layers should be of a considerable thickness. These thick layers are practically unacceptable in recent weighing apparatus which are required to be compact and complex in their internal structure. In addition, the cost of attaching the lining or coating layers to the complex structural members is prohibitively high.

SUMMARY OF THE INVENTION

It is an object of the present invention to provide an automatic combinatorial weighing apparatus having inner and outer collection chutes disposed in the delivery paths for passage of articles and capable of equalizing the times in which the articles flow down the chutes as much as possible and also of increasing the speeds of flow of the articles down the chutes as much as possible.

Another object of the present invention is to provide an automatic combinatorial weighing apparatus capable of suppressing vibration arising from hitting engagement of articles flowing in delivery paths through the apparatus, thereby reducing noise produced by the apparatus.

According to the present invention, there is provided an automatic combinatorial weighing apparatus including delivery paths for passage of articles to be weighed and a collection chute assembly disposed in and defining the delivery paths. The collection chute assembly includes an inner collection chute in the form of a truncated cone having an outlet, a pair of outer collection chutes disposed outwardly of the inner collection chute and having respective outlets, and plurality of timing hoppers connected to the outlets, respectively, of the inner and outer collection chutes. Also included are a discharge chute having an outlet and coupled to the timing hopper connected to the outlet of the inner collection chute, and a common discharge chute having a single outlet and coupled to the timing hoppers connected to the outlets of the outer collection chutes.

The collection chute assembly also includes a vibration damper having vibration-restriction damping capability and disposed in an area of the delivery paths for damping vibration of the area arising from hitting engagement with the articles.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a side elevational view of the upper outer collection chute;

FIG. 8 is a side elevational view of the lower outer collection chute;

FIG. 9 is a side elevational view of the upper inner collection chute;

FIG. 10 is a side elevational view of the lower inner collection chute;

DESCRIPTION OF THE PREFERRED EMBODIMENTS

Figure 1:
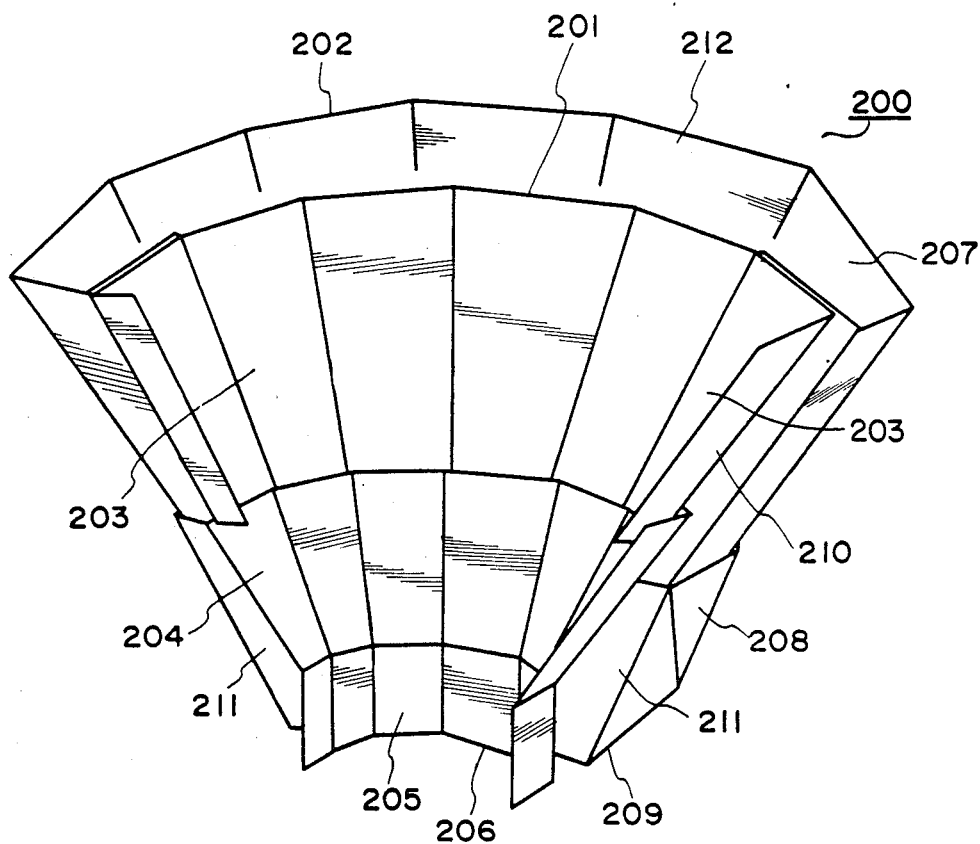
FIG. 1 is a perspective view of a half of a collection chute assembly.

FIGS. 1 through 17 illustrate a collection chute assembly for use in an automatic combinatorial weighing apparatus according to the present invention.

A collection chute assembly 200 is designed for use in an automatic combinatorial weighing apparatus having 14 heads. The collection chute assembly 200 is composed of an inner collection chute 201 having the shape of a truncated pyramid and an outer collection chute 202 also having the shape of a truncated pyramid, the inner and outer collection chutes 201, 202 being shown in their halves in FIG. 1. The collection chute assembly 200 is therefore shown as having partition sides for 7 heads. The inner collection chute 201 comprises an upper inner collection chute 203, a lower inner collection chute 204, and a discharge chute 205 in the form of a 14-sided tubular prism having an outlet 206. The outer collection chute 202 has a pair of upper outer collection chutes 207 and a pair of lower outer collection chutes 208 having respective square outlets 209. The halves of the outer collection chute 202 and the inner collection chute 201 are joined to each other by upper and lower vertically elongate flat panels or partitions 210, 211 which define a discharge clearance 212 between the inner and outer collection chutes 201, 202.

Figure 21:
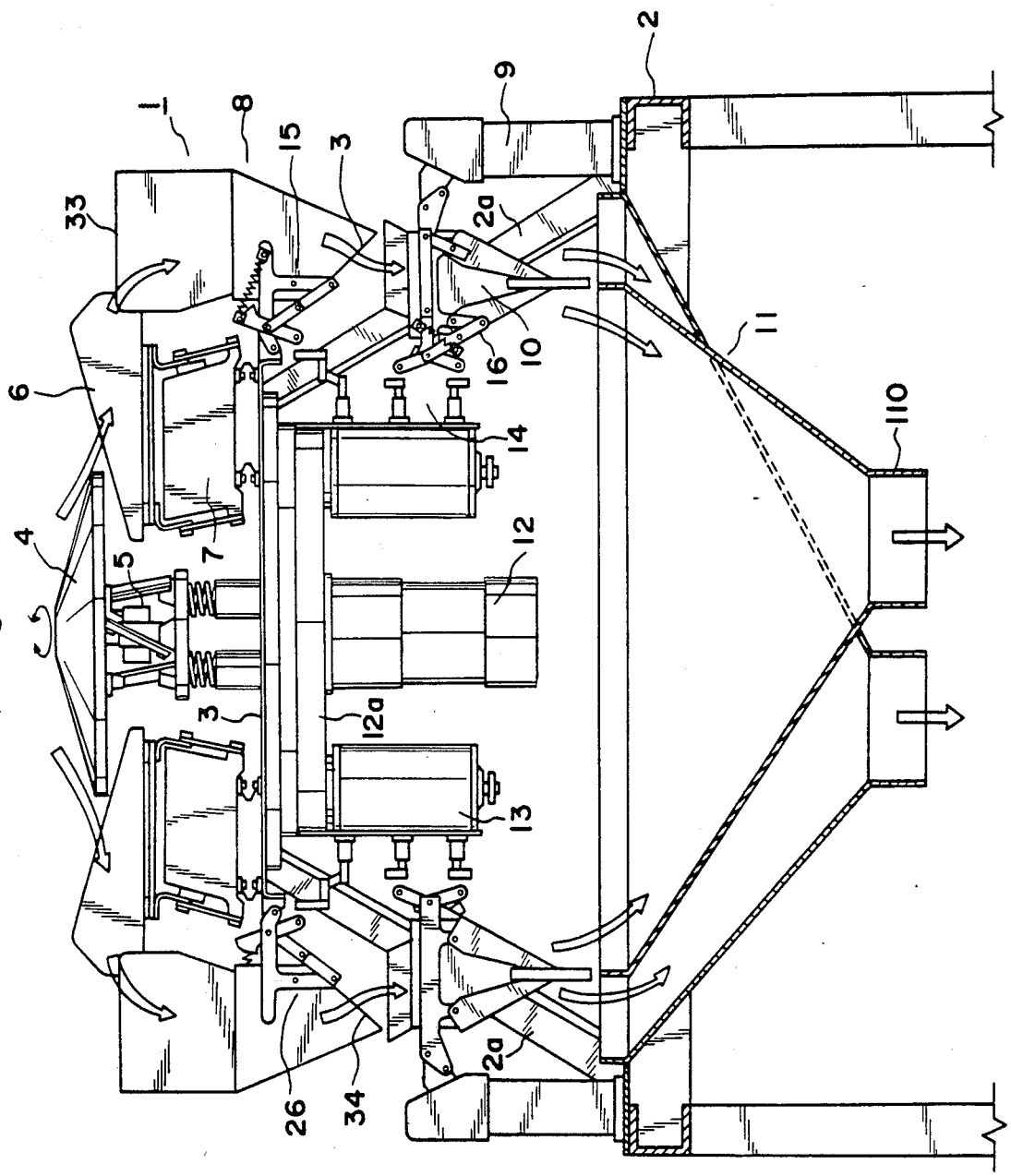
FIG. 21 is a side elevational view of a general arrangement of an automatic combinatorial weighing apparatus.
Figure 22:
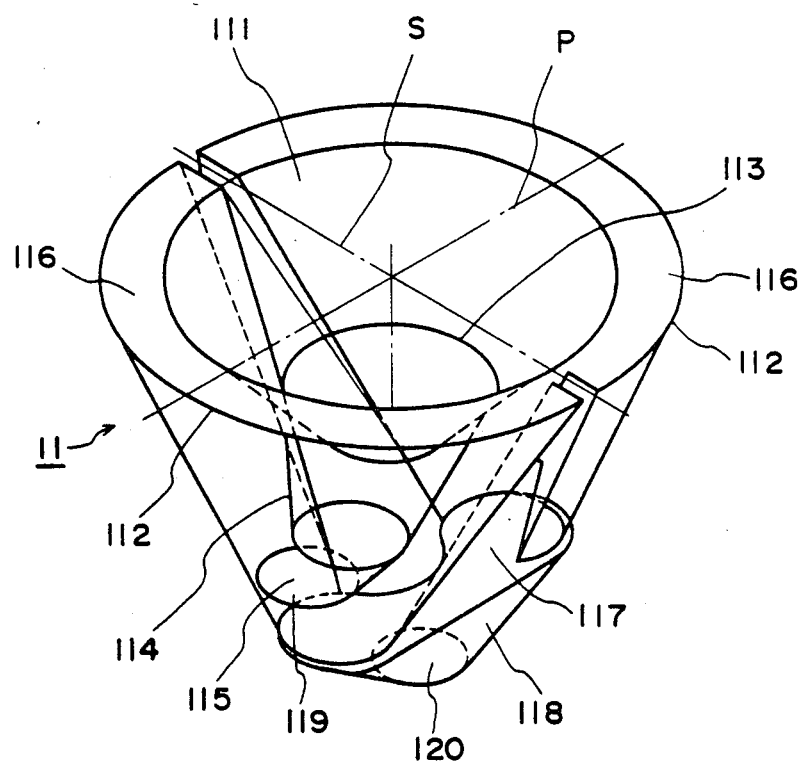
FIG. 22 is a schematic perspective view of a conventional double collection chute assembly.

Articles discharged from the inwardly opened lids of the weighing hoppers 10 (FIG. 21) fall through the upper and lower inner collection chutes 203, 204, the discharge chute 205, and the outlet 206. Articles discharged from the outwardly opened lids of the weighing hoppers 10 fall through the discharge clearance between the inner and outer collection chutes 201, 202, i.e., through the upper and lower outer collection chutes 207, 208, and the square outlets 209. The discharge clearances 212 in the halves of the collection chute 200 are separated from each other by the upper and lower partitions 210, 211. The inner and outer collection chutes 201, 202 are symmetrical with respect to two mutually perpendicular planes extending diametrically across the collection chute assembly 200.

Figure 2:
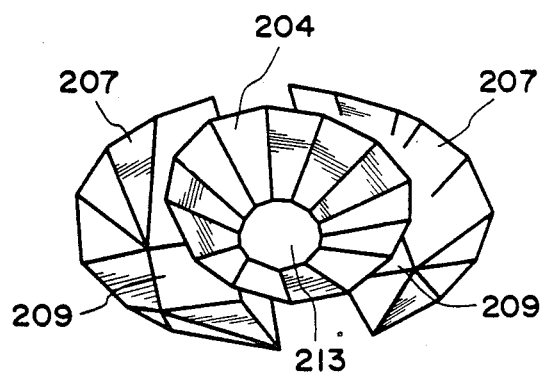
FIG. 2 is a perspective view of lower inner and outer collection chutes.

The lower inner collection chute 204 and the upper outer collection chutes 207 are shown in perspective in FIG. 2. The lower inner collection chute 204 and its outlet 213 are axially symmetrical. Although not shown in FIG. 2, the lower outer collection chutes 208 having the outlets 209 are connected to the upper outer collection chutes 207, respectively. The outlet 213 of the lower inner collection chute 204 is connected to the discharge chute 205.

Figure 3:
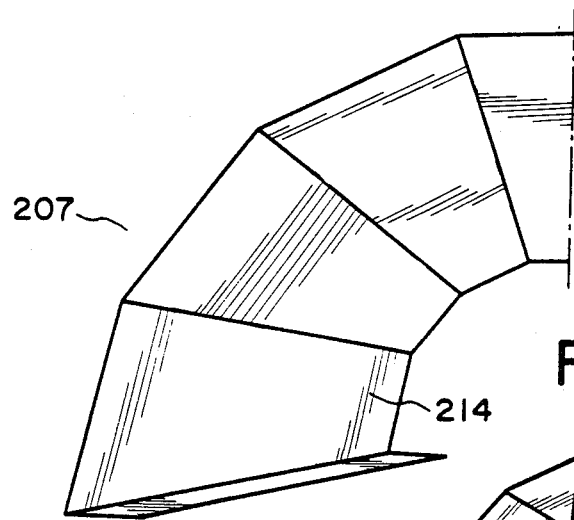
FIG. 3 is a plan view of an upper outer collection chute.
Figure 4:
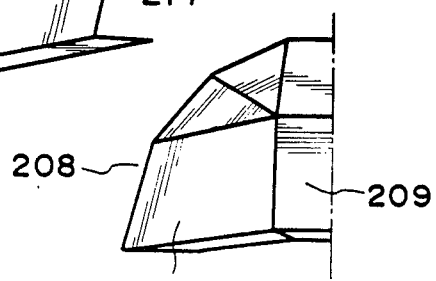
FIG. 4 is a plan view of the lower outer collection chute.
Figure 5:
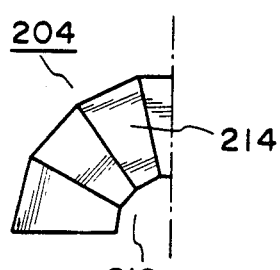
FIG. 5 is a plan view of the lower inner collection chute.
Figure 6:
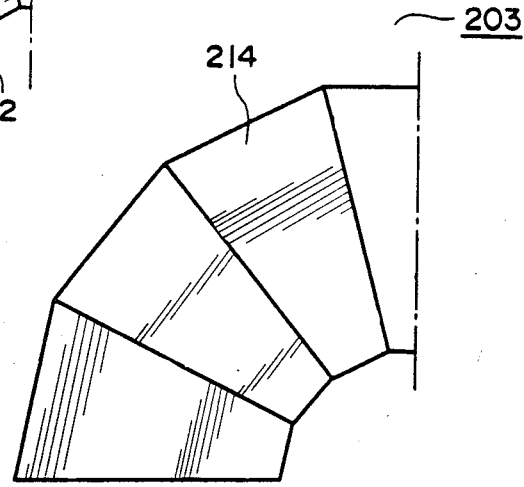
FIG. 6 is a plan view of an upper inner collection chute.

FIGS. 3 and 4 show, in plan, a quarter of one of the upper outer collection chutes 207 and a quarter of one of the lower outer collection chutes 208, respectively. FIGS. 5 and 6 illustrate, in plan, a quarter of the upper inner collection chute 203 and a quarter of the lower inner collection chute 204. FIGS. 7 and 8 show, in side elevation, the quarters of the upper and lower outer collection chutes 207, 208. FIGS. 9 and 10 show, in side elevation, the quarters of the upper inner collection chute 23 and the lower inner collection chute 204.

Figure 11:
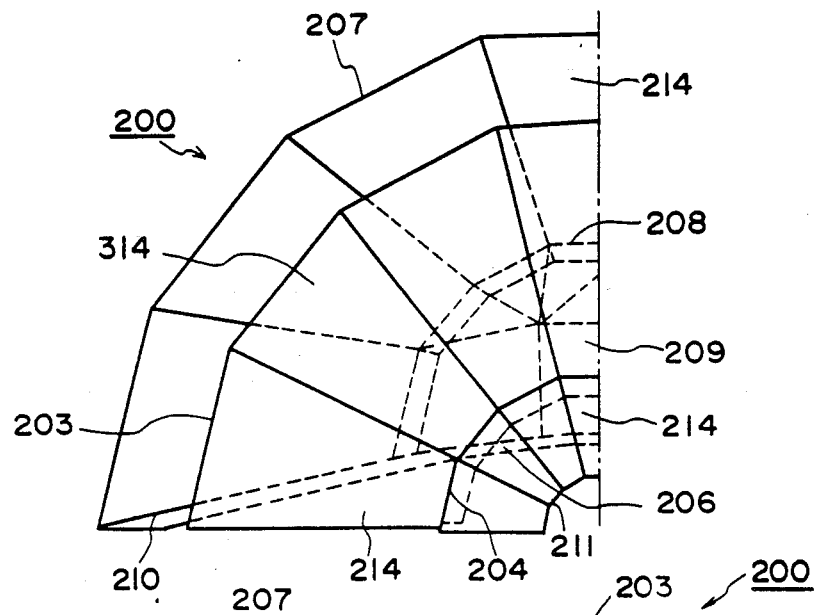
FIG. 11 is a plan view of a quarter of the collection chute assembly where the chutes are superimposed.
Figure 12:
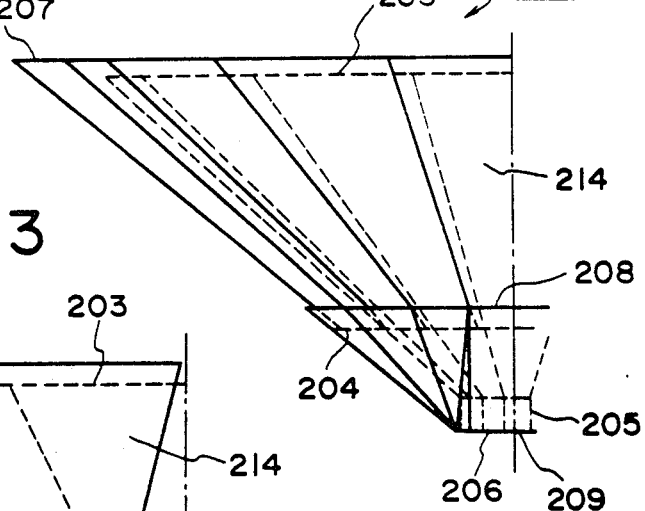
FIG. 12 is a plan view of the quarter of the collection chute assembly.
Figure 13:
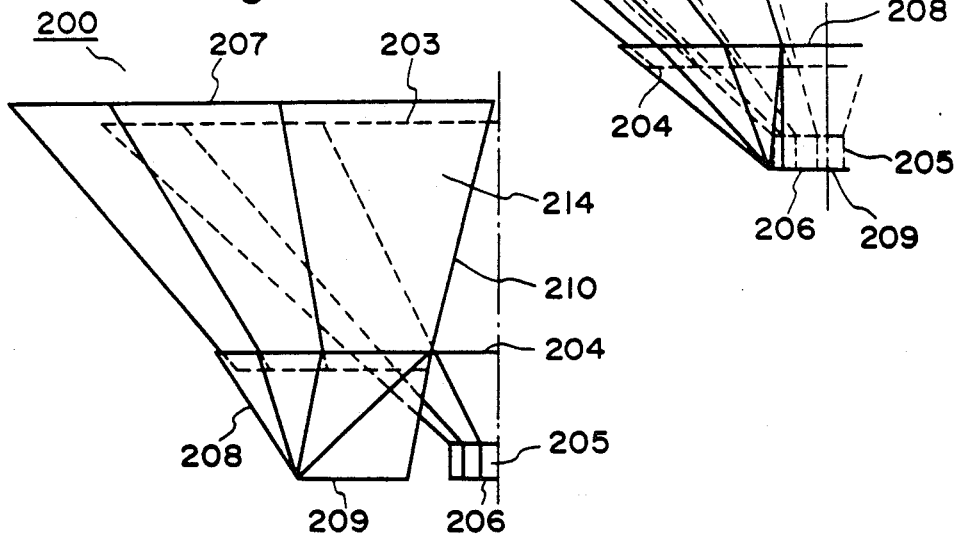
FIG. 13 is front elevational view of the quarter of the collection chute assembly.

FIG. 11 shows, in a plan view, the superimposed quarters of the upper and lower outer collection chutes 207, 208 and the upper and lower inner collection chutes 203, 204. FIG. 12 shows the same superimposed chute quarters in side elevation, and FIG. 13 shows the same superimposed chute quarters in front elevation.

Each of the collection chutes 203, 204, 207, 208 comprises a number of flat panels 214 joined through bent edges and lying in different angular planes. The partitions 210, 211 have portions held against the inner and outer collection chutes 201, 202.

Figure 14:
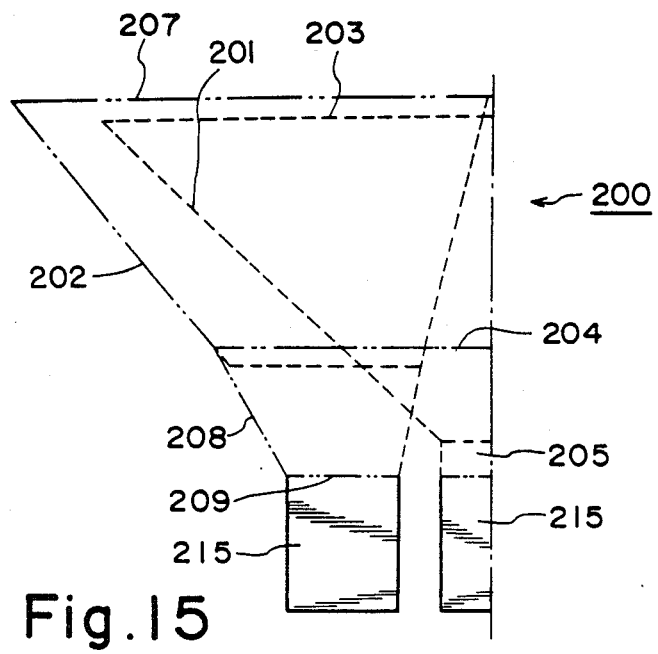
FIG. 14 is a front elevational view of connected timing hoppers of the outer and inner collection chutes.
Figure 15:
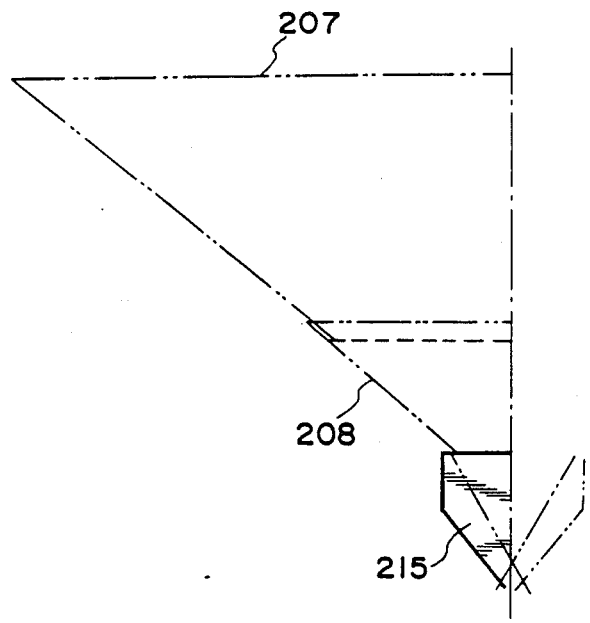
FIG. 15 is a side elevational view of the connected timing hoppers of the outer and inner collection chutes.

As shown in FIGS. 14 and 15, timing hoppers 215 are connected to the outlets 209 of the lower outer collection chutes 208 and the outlet 206 of the discharge chute 205 coupled to the lower inner collection chute 204. The timing hoppers 215 are coupled to mechanisms (not shown) actuated by pneumatic cylinders for opening and closing the timing hoppers 215.

More specifically, one timing hopper 215 is joined to each of the lower outer collection chutes 208, and one timing hopper 215 is connnected to the discharge chute 205, as shown in FIG. 14. Therefore, a pair of timing hoppers 215 is coupled to the outer collection chute 202, whereas one timing hopper 215 is coupled to the inner collection chute 201. In FIGS. 14 and 15, the outer and inner collection chutes 202, 201 have the same paths for flow of articles, or the same article delivery paths, from the weighing hoppers 10 (FIG. 21) down to the lower timing hoppers 215 in areas defined by symmetrical planes which intersect at 90°. The article delivery paths through the inner collection chute 201 are axially symmetrical.

In each of the inner and outer collection chutes 201, 202, the surfaces along which the articles flow are defined by the angularly arranged flat panels 214 from the upper end to the lower end of the article delivery paths for the respective heads of the apparatus. Since the flat panels are joined by bent edges or valleys, the articles flowing down the delivery paths tend to go down the valleys while being forcibly guided thereby through the shortest distance along the delivery paths.

Therefore, the flat panels 214 between the bent edges serve to prevent the articles from flowing in roundabout paths.

Figure 16:
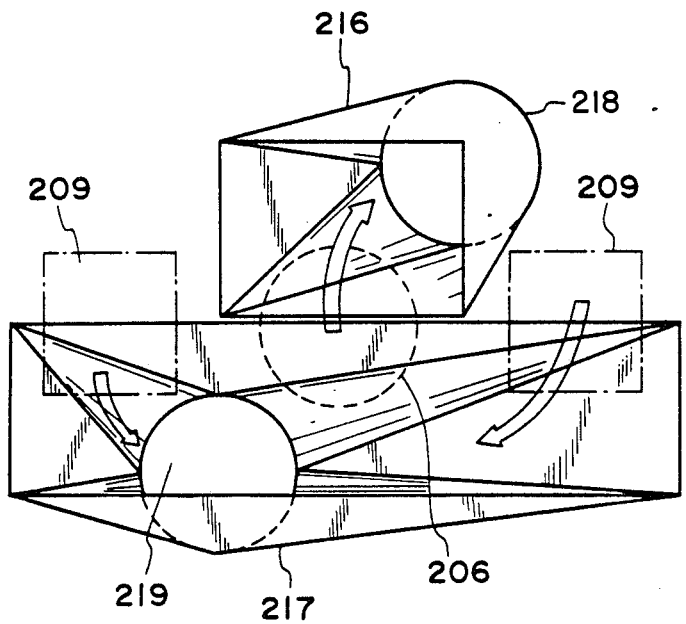
FIG. 16 is a plan view of discharge chutes connected to inner and outer outlets.
Figure 17:
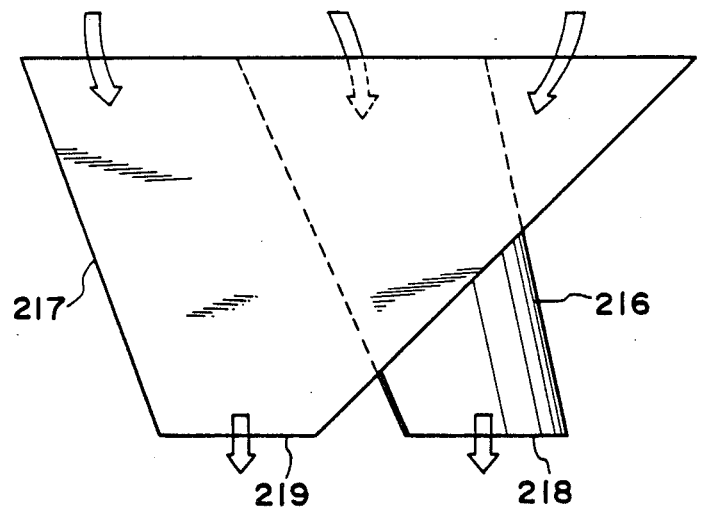
FIG. 17 is a front elevational view of the discharge chutes.

As illustrated in FIGS. 16 and 17, a discharge chute 216 connected to the timing hopper 215 of the inner collection chute 201 extends downwardly and is offset or displaced to one side of the plane with respect to which the outer collection chutes 202 are symmetrical, the discharge chute 216 having an outlet 218 connected to a nozzle of a packaging machine (not shown). A common discharge chute 217 connected to the timing hoppers 215 of the outer collection chute 201 extends downwardly and has an outlet 219 offset or displaced to the other side of the symmetry plane, the outlet 219 being connected to another nozzle of the packaging machine. Therefore, the inner outlet 218 and the outer outlet 219 are positioned symmetrically with respect to a point. Each of the discharge chutes 216, 217 is composed of a plurality of angularly joined flat panels.

As shown in FIG. 16, the paths extending from the timing hoppers 215 of the outer collection chute 202 toward the outlet 219 of the discharge chute 217 are slightly differently slanted. However, the lengths of these paths are substantially the same, and these timing hoppers 215 can electrically be controlled for opening timing to discharge the articles from the timing hoppers 215 and pass through the outlet 219 simultaneously. Therefore, there is no time delay in discharging the articles from the outlet 219, and hence the subsequent packaging process is not substantially affected.

The outlet 218 of the discharge chute 216 which is offset from the timing hopper 215 of the inner collection chute 201 is substantially free from any undesirable effects based on that timing hopper 215.

Articles discharged from the upper article feeder are fed by the distributing table 4 (FIG. 21) via the radial troughs 6 and the pool hoppers 8 into the weighing hoppers 10, in which the articles are weighed by the weighing devices 9. Weight signals from the weighing devices 9 are applied to an arithmetic control unit comprising a microcomputer which selects the weighing hoppers 10 that gives a weight combination equal or closest to a target weight. Then, the arithmetic control unit alternately opens the inner and outer lids of the selected weighing hoppers 10 to discharge the articles into the inner and outer collection chutes 201, 202. The articles discharged into the inner collection chute 201 flow uniformly therethrough toward the outlet 206 since the inner collection chute 201 is axially symmetrical. Inasmuch as the flat panels 214 are separated by the edges therebetween, the articles are guided to flow in the shortest delivery paths through the inner collection chute 201 and then discharged from the outlet 206 into the timing hopper 215 at the same timing. As the timing hopper 215 is opened, the articles are delivered through the discharge chute 216 and its outlet 218 into the nozzle of the packaging machine.

When the outer lids of the weighing hoppers 20 are opened, articles are discharged into the clearances 212 between the outer and inner collection chutes 202, 201. The articles are then allowed to flow down the flat panels 214 of the outer collection chutes 202. Since the flat panels 214 are bounded by the edges therebetween, the articles as they flow down the flat panels 214 can be supplied smoothly without going round about and jumping into the lower outer collection chutes 208, from which the articles are supplied through the outlets 209 into the respective timing hoppers 215.

The outer collection chutes 202 are symmetrical with respect to a pair of planes crossing at 90°. The articles as they flow down the outer collection chutes 202 are guided by the edges between the flat panels 214 to flow smoothly without passing through roundabout paths. Consequently, the articles follow the same delivery paths without being disturbed and without jumping and reach the timing hoppers 215 at the same time.

Then, the articles are supplied from the timing hoppers 215 into the common discharge chute 217. Since the delivery paths from the timing hoppers 215 to the outlet 219 are different as shown in FIG. 16, the timing hopper 215 connected to the longer delivery path is controlled to open at a faster timing, and the timing hopper 215 connected to the shorter delivery path is controlled to open at a later timing. The articles supplied from the outer collection chutes 202 into the common discharge chute 217 arrive at the outlet 219 at the same time, and then are discharged therefrom into the nozzle of the packaging machine in which they are packaged.

As seen from above the inner and outer collection chutes 201, 202, the articles flowing therethrough follow straight delivery paths led to the timing hoppers 215.

The present invention is not limited to the illustrated embodiment. The delivery paths in the inner and outer collection chutes may be defined by any shapes which have some kinds of valleys, rather than sharp edges, and which prevent articles from flowing in roundabout paths. The pair of outer collection chutes may be spaced from the inner collection chute by any distance which can appropriately be designed.

Figure 18:
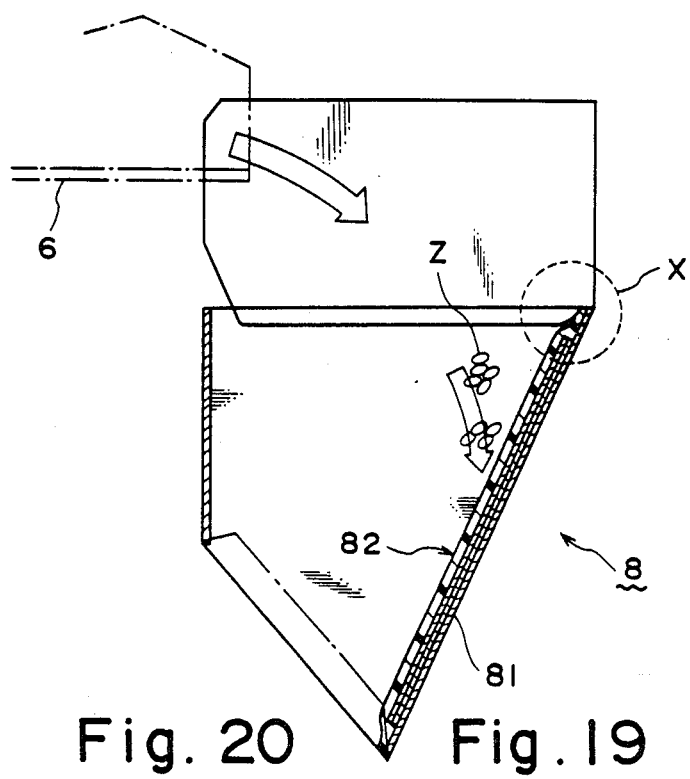
FIG. 18 is a side elevational view of a pool hopper employed in an automatic combinatorial weighing apparatus according to the present invention.
Figures 19, 20:
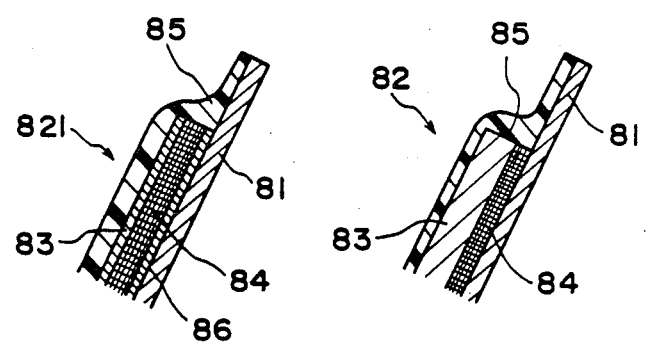
FIG. 19 is an enlarged fragmentary cross-sectional view of an encircled area X in FIG. 18.
FIG. 20 is an enlarged fragmentary cross-sectional view of a pool hopper according to another embodiment of the present invention.

FIGS. 18 and 19 illustrate a sound-insulating structure in the automatic combinatorial weighing apparatus. The sound-insulating structure can be employed on any wall surface upon which articles will impinge violently, such as of the pool hoppers 8, the inner collection chute 201, the outer collection chute 202, the lower inner collection chute 204, the lower outer collection chute 208, and the timing hoppers 215. In the illustrated embodiment, the sound-insulating structure is incorporated in each of the pool hoppers 8. As shown in FIG. 18, relatively hard articles Z such as candies or beans drop from the radial trough 6 into the pool hopper 8 along a parabolic path. The articles Z falling off the radial trough 6 would impinge upon an outer panel 81 of the pool hopper 8 and produce noise due to vibration of the outer panel 81. According to the illustrated embodiment, a vibration damper 82 is attached to the inner surface of the outer panel 81.

The vibration damper 82 which is commercially available comprises a base 83 and a viscoelastic member 84 applied as a tape to the base 83 and made of macromolecular material capable converting vibratory energy into thermal energy. The vibration damper 82 is attached to the panel 81 such that the viscoelastic tape 84 is applied by an adhesive to the panel 81 with the base 83 positioned inwardly away from the panel 81. The vibration damper 82 and the panel 81 are then lined with a urethane coating 85 so as to be covered therewith.

The urethane coating 85 extends sufficiently to cover the edges of the base 83 so that the base 83 will be prevented from peeling off at its edges by being hit by the solid articles. The panel 81 serves as a vibration-restricting plate.

Many panels employed in the combinatorial weighing apparatus 1 are made of stainless steel, and their outer surfaces should preferably be shiny and flat from a hygienic design standpoint. Since the vibration damper 82 is mounted on the inner surface of the panel 81, the outer surface thereof remains flat and shiny as it is free from surface irregularities, poor appearance, and color differences which would otherwise result from a urethane coating on the outer panel surface.

The vibration damper 82 prevents articles Z from directly hitting the inner surface of the panel 81. The articles Z are instead caused to hit the urethane coating 85 and then drop into the pool hopper 8. At this time, the base 83 is caused to vibrate and the vibratory energy produced by the base 83 is converted by the viscoelastic tape 84 into thermal energy. Due to this vibration-restricting damper effect, the panel 81, as a vibration-restricting plate is prevented from inducing resonant vibratng and hence from producing noise. The pool hopper 8 therefore operates very quietly.

Even if articles Z are directed to hit an edge of the base 83, the edge covered with the urethane coating 85 is protected against wear and serves to cushion the articles Z, which are therefore protected from damage.

A vibration damper of the same construction may be attached to the inner surface of each of the lids of the weighing hoppers 10 upon which articles from the pool hoppers 8 tend to impinge, or to each of the inner surfaces of the collection chutes against which articles are directed from the weighing hoppers 10, or to the inner surface of each of the radial troughs 6 against which articles from the distributing table 4 are discharged.

It is possible to attach a vibration damper to the outer surface of the panel 81 for the purpose of attenuating noise, and also to a surface on which articles are likely to roll and slide. It is not necessary to apply a urethane coating to such a vibration damper on the outer panel surface which is not exposed to direct external view.

FIG. 20 shows a vibration damper according to another embodiment of the present invention. The vibration damper, generally designated at 821, is assembled as a unit comprising a base 83 in the form of a commercially available vibration damping steel sheet, a vibration-restricting plate 86, and viscoelastic tape 84 interposed therebetween. The vibration damper unit 821 is applied by an adhesive to the inner surface of the panel 81, and the vibration damper unit 821 and the panel 81 are covered with a urethane coating 85. The vibration damper 821 is as advantageous as the vibration damper 82 shown in FIGS. 18 and 19.

Although certain preferred embodiments have been shown and described, it should be understood that many changes and modifications may be made therein without departing from the scope of the appended claims.

What we claim is:

1. An automatic weighing apparatus delivery path system including delivery paths mounted on a frame and for passage of articles to be weighed and a collection chute assembly disposed in and defining said delivery paths and comprising:
    an inner collection chute coupled to the frame, in the form of a truncated cone having an outlet and comprising angularly joined flat panels;
    a pair of outer collection chutes coupled to the frame, disposed outwardly of said inner collection chute and having respective outlets, and each comprising angularly joined flat panels;
    a first discharge chute coupled to the frame, having an outlet and coupled to receive articles from the outlet of the inner collection chute;
    a second discharge chute coupled to the frame, having a single outlet and coupled to receive articles from the outlets of said pair of outer collection chutes; and
    a vibration damper having a vibration-restriction damping capability and disposed in an area of said delivery paths for damping vibration of said area arising from hitting engagement with the articles, said vibration damper comprising:
    a vibration restricting plate contacting the area;
    a viscoelastic member contacting said plate;
    a vibration damping base contacting said member; and
    a urethane coating covering the area, said base, said member and said plate.

* * * * *